United States Patent [19]
Maher, Jr.

[11] Patent Number: 5,938,961
[45] Date of Patent: Aug. 17, 1999

[54] ELECTRONIC CONTROLLER FOR HEATING APPARATUS

[76] Inventor: Charles A. Maher, Jr., 1835 W. Phoenix Ct., Mustang, Okla. 73064-1204

[21] Appl. No.: 09/026,273

[22] Filed: Feb. 19, 1998

Related U.S. Application Data

[63] Continuation of application No. 08/734,864, Oct. 23, 1996, Pat. No. 5,827,556.

[51] Int. Cl.$^6$ .................................................. H05B 1/02
[52] U.S. Cl. ........................ 219/497; 219/506; 219/442; 219/499; 99/403; 99/328; 99/330; 364/557
[58] Field of Search .................... 219/499, 506, 219/494, 501, 492, 497, 441, 442; 99/330, 331, 403, 332, 333, 336, 328; 364/400, 557

[56] References Cited

U.S. PATENT DOCUMENTS

| | | | |
|---|---|---|---|
| 3,094,875 | 6/1963 | Fluegel | 364/557 X |
| 3,217,633 | 11/1965 | Anetsberger | 99/327 |
| 3,326,692 | 6/1967 | Martino et al. | 99/111 |
| 3,525,299 | 8/1970 | Gouwens | 99/336 |
| 3,665,159 | 5/1972 | Becker et al. | 219/497 |
| 3,694,669 | 9/1972 | Witt et al. | 219/492 X |
| 3,732,468 | 5/1973 | Witt et al. | 99/344 X |
| 3,800,779 | 4/1974 | Moore et al. | 126/374 |
| 3,863,049 | 1/1975 | Hinman | 219/389 |
| 3,866,472 | 2/1975 | Witt | 73/362 AR |
| 3,870,859 | 3/1975 | Price | 219/437 |
| 3,904,852 | 9/1975 | Rivelli et al. | 219/442 |
| 3,911,250 | 10/1975 | Price | 219/442 |
| 3,924,101 | 12/1975 | Beard | 219/490 |
| 3,938,498 | 2/1976 | Price | 126/374 |
| 3,950,632 | 4/1976 | Rivelli | 219/523 |
| 3,955,067 | 5/1976 | Eldridge | 219/497 |
| 3,979,056 | 9/1976 | Barnes | 99/333 X |
| 3,998,146 | 12/1976 | Price | 99/403 |
| 4,032,749 | 6/1977 | Price | 219/442 |
| 4,036,995 | 7/1977 | Koether et al. | 426/233 |
| 4,058,703 | 11/1977 | Price | 219/492 |
| 4,077,690 | 3/1978 | Koether | 339/89 R |
| 4,097,707 | 6/1978 | Kobayashi et al. | 219/10.55 B |
| 4,195,667 | 4/1980 | Moore et al. | 137/637.1 |
| 4,197,581 | 4/1980 | Watrous et al. | 364/400 |
| 4,206,872 | 6/1980 | Levine | 236/46 R |
| 4,210,123 | 7/1980 | Moore et al. | 126/374 |
| 4,210,177 | 7/1980 | Moore et al. | 137/613 |
| 4,259,567 | 3/1981 | Moore et al. | 219/327 |
| 4,278,872 | 7/1981 | Koether et al. | 219/497 |
| 4,282,423 | 8/1981 | Volz | 219/490 |
| 4,296,632 | 10/1981 | Bloomer et al. | 73/362 AR |
| 4,301,509 | 11/1981 | Haase et al. | 364/557 |
| 4,320,285 | 3/1982 | Koether | 219/497 |
| 4,324,173 | 4/1982 | Moore et al. | 99/330 |

(List continued on next page.)

OTHER PUBLICATIONS

Omega Catalog, 1989, pp. P–5–P–8, P–10, P–11.
Ziemacki, Mike, "Fuzzy Logic Microcontroller," ECN.

*Primary Examiner*—Mark Paschall
*Attorney, Agent, or Firm*—Mark Kusner

[57] ABSTRACT

A controller for controlling the cooking of food within a cooking apparatus. The controller is comprised of a temperature sensor input for receiving an output of a temperature sensor and a system for initiating a cook of a food product based upon a set cook temperature and a set cook time. Plural indications of incremental energy that is absorbed by the food product during the cook are determined, wherein each of the plural indications of incremental energy is based upon a difference between a temperature determined at the temperature sensor input and a desired internal temperature of the food product. The end of the cook is established when the total of the plural indications of incremental energy is one of equal to and greater than an ideal energy to prepare the food product based upon the set cook time and the cook temperature.

16 Claims, 6 Drawing Sheets

U.S. PATENT DOCUMENTS

| | | | |
|---|---|---|---|
| 4,362,094 | 12/1982 | Polster | 99/342 |
| 4,379,964 | 4/1983 | Kanazawa et al. | 219/492 |
| 4,401,884 | 8/1983 | Kusunoki et al. | 219/492 |
| 4,420,006 | 12/1983 | Moore et al. | 134/167 R |
| 4,437,159 | 3/1984 | Waugh | 364/400 |
| 4,455,480 | 6/1984 | Matsumoto et al. | 219/497 |
| 4,503,320 | 3/1985 | Polster | 219/441 |
| 4,549,527 | 10/1985 | Davis | 126/374 |
| 4,551,618 | 11/1985 | Payne | 219/510 |
| 4,585,925 | 4/1986 | Andre | 219/497 |
| 4,601,004 | 7/1986 | Holt et al. | 364/557 |
| 4,636,949 | 1/1987 | Longabaugh | 374/400 |
| 4,663,710 | 5/1987 | Waugh et al. | 364/400 |
| 4,672,540 | 6/1987 | Waugh et al. | 364/400 |
| 4,688,475 | 8/1987 | Witt et al. | 99/325 |
| 4,740,888 | 4/1988 | Ceste, Sr. et al. | 364/187 |
| 4,742,455 | 5/1988 | Schreyer | 364/400 |
| 4,782,445 | 11/1988 | Pasquini | 364/400 |
| 4,812,625 | 3/1989 | Ceste, Sr. | 219/497 |
| 4,812,963 | 3/1989 | Albrecht et al. | 364/131 |
| 4,858,119 | 8/1989 | Waugh et al. | 364/400 |
| 4,864,498 | 9/1989 | Pasquini et al. | 364/400 |
| 4,901,917 | 2/1990 | Littell, III | 236/46 R |
| 4,911,068 | 3/1990 | Koether et al. | 99/325 |
| 4,913,038 | 4/1990 | Burkett et al. | 99/331 |
| 4,968,515 | 11/1990 | Burkett et al. | 426/233 |
| 5,043,860 | 8/1991 | Koether et al. | 364/138 |
| 5,044,262 | 9/1991 | Burkett et al. | 99/327 |
| 5,060,559 | 10/1991 | Winter | 99/325 |
| 5,220,864 | 6/1993 | Ejiri et al. | 99/330 |
| 5,235,148 | 8/1993 | Yamaguchi et al. | 219/10.55 B |
| 5,240,725 | 8/1993 | Akamatsu et al. | 426/233 |
| 5,352,865 | 10/1994 | Burkett et al. | 219/486 |
| 5,352,866 | 10/1994 | Cartwright et al. | 219/497 |
| 5,454,511 | 10/1995 | Van Ostrand et al. | 236/46 R |
| 5,575,194 | 11/1996 | Maher, Jr. et al. | 99/330 |
| 5,596,514 | 1/1997 | Maher, Jr. et al. | 364/569 |

COOK TIME SETTING

FIG. 8

IDEAL TEMPERATURE
SETTING

FIG. 9

% OF COOK COMPLETED

FIG. 10

ELECTRONIC CONTROLLER FOR HEATING APPARATUS

This application is a continuation of U.S. patent application Ser. No. 08/734,864 filed on Oct. 23, 1996 now U.S. Pat. No. 5,827,556.

FIELD OF THE INVENTION

The present invention relates generally to an electronic control system, and more particularly, to a control system for use with a heating apparatus. The present invention finds advantageous application to a deep-fat fryer, cooking system, and will be described with particular reference thereto, it being appreciated, however, that the present invention has broader applications, and may be used with other heating apparatus, such as ovens, pressure cookers, pasta cookers, holding cabinets and the like.

BACKGROUND OF THE INVENTION

Many restaurants and food service establishments, particularly national chain fast-food restaurants, have established strict cooking requirements for preparation of foods to control product quality and uniformity. Such establishments will often require cooking systems, such as a deep-fat fryer, which can accurately and repeatedly prepare foods to a desired standard. In this respect, most national restaurants have established cook times and cook temperatures at which particular foods are to be cooked to establish the desired quality and uniformity of the product nationwide. These standardized cook times and cook temperatures are established to ensure proper preparation of the food and to present a tasty and healthful product. Factors determining the standards set by restaurants include appearance, taste and the internal temperature of the cooked food. With respect to the latter, of primary importance in establishing cook criteria standards is that the internal temperature of the food be brought up to a predetermined minimum so as to kill harmful bacteria and ensure a healthy product.

The cooking standards or cooking criteria for a particular food are basically established through a trial-and-error technique. Namely, small amounts of the specific food product, i.e., a few french fries or one or two pieces of chicken or fish, are dropped into a cooking medium, such as oil, and monitored until the food product has obtained the desired appearance, at which time it is removed and tested to determine that the internal temperature has reached the desired minimum. After several repeated tests at different oil temperatures and times, a desired cook time and cook temperature are established. The cook time and cook temperature thus represent ideal conditions for cooking the particular food product to produce the desired end product.

As known to those skilled in the art, the cook criteria established by restaurants and food chains assumes ideal cooking conditions, wherein the cooking medium maintains a predetermined temperature throughout the cook. The standard cook criterion is also based upon an idealization that irrespective of the amount of product placed into the fryer, if each individual piece of the food product (e.g., one french fry in a batch of french fries, or one piece of chicken in a batch of chicken, or one piece of fish in a batch of fish) is surrounded by the cooking medium at a predetermined temperature, and that temperature is maintained for the desired time, all the food product within the batch will be properly prepared to the desired standard.

In reality, when a large number of pieces of cold food are placed into a hot cooking medium, the temperature of the cooking medium drops. As a result, the food product within the cooking medium is exposed to a lower temperature than that ideally determined, and thus the cooking of the food will be slower than desired. To compensate for this, fryer controllers have been developed, which among other things, control the operation of the heating element and the cook time as a function of the change in temperature of the cooking medium that occurs when cold food product is introduced into the hot cooking medium. The cook time is basically adjusted by expanding the cooking time to compensate for the fact that the food is exposed to a cooking medium at a temperature lower than that desired. Numerous systems have been developed to adjust the cooking time to compensate for the differences which exist between the actual cooking temperature and the desired cooking temperature.

The present invention provides an electronic control system that controls the cooking of the food product by monitoring heat transferred from the cooking medium to the food product.

SUMMARY OF THE INVENTION

In accordance with the present invention, there is provided a cooking appliance including means for sensing the temperature of a cooking medium, means for initiating a cook of food product disposed in the cooking medium, and a controller operatively connected to the temperature sensing means for determining the duration of the cook as a function of a difference between a user selected cooking medium temperature and the desired internal temperature of the food product.

In accordance with another aspect of the present invention, there is provided a cooking appliance, including a vat for holding a cooking medium, a temperature sensor for sensing the temperature of the cooking medium, and a controller for controlling the cooking of a food product disposed in the cooking medium as a function of the difference between a desired internal temperature of the food product and the temperature of the cooking medium during the cook.

It is an object of the present invention to provide a controller for controlling the heating of a food product.

Another object of the present invention is to provide a controller as defined above which controls the cooking of a food by monitoring the heat transferred to the food product by the cooking medium.

Another object of the present invention is to provide a controller as defined above which controls the cooking of a food by comparing the heat transferred to the food product by the cooking medium against a desired standard.

A still further object of the present invention is to provide a controller as defined above, wherein the operation of the controller is based upon the principles of thermodynamics.

Another object of the present invention is to provide a controller as described above which terminates a cook cycle when the amount of heat transferred to a food product reaches a predetermined amount.

A still further object of the present invention is to provide a controller as described above for controlling the cooking of food in a deep-fat fryer.

These and other objects and advantages will become apparent from the following description of a preferred embodiment of the invention, taken together with the accompanying drawings.

BRIEF DESCRIPTION OF THE DRAWINGS

The invention may take form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Figure 1:
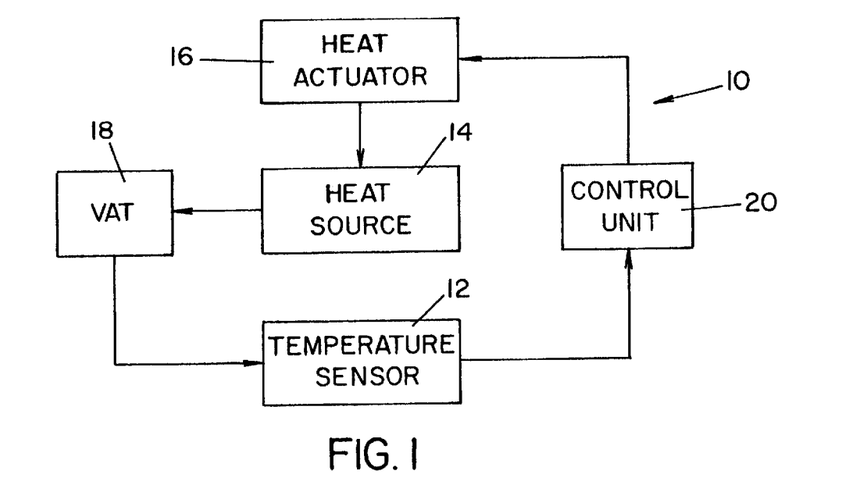
FIG. 1 is a schematic block diagram of a deep-fat fryer.

Referring now to the drawings, wherein the purpose is for illustrating the preferred embodiment of the invention only, and not for the purpose of limiting same, the present invention relates generally to a control system for use with a heating apparatus to control heating of a food product. The present invention shall be described with respect to a deep-fat fryer, although it will be appreciated that the present invention finds advantageous application to other devices for heating food products. FIG. 1 shows a schematic block diagram of a deep-fat fryer 10 comprising a temperature sensor 12, a gas burner 14, a gas valve 16, a vat 18 and a control unit 20 for controlling the operation of the deep-fat fryer.

Broadly stated, the present invention relates to heating or cooking food products in a cooking or heating medium by monitoring and controlling the amount of thermal energy transferred to the food product from the surrounding heating or cooking medium. The present invention in principle is based upon several theories of classical thermodynamics and engineering heat transfer. As will be understood by those skilled in the art, classical thermodynamics deals with the states of systems from a macroscopic view and makes no hypotheses about the structure of matter. Generally, to perform a thermodynamic analysis, it is necessary to describe the state of a system in terms of gross characteristics, such as temperature, pressure and volume, which can be measured directly and involve no special assumptions regarding the structure of matter. These variables or thermodynamic properties are of significance for the system as a whole only when they are uniform throughout the system, i.e., when the system is in equilibrium. Thus classical, equilibrium thermodynamics is not concerned with the details of process, but rather with equilibrium states and the relations among them. In other words, a thermodynamic analysis deals with idealized processes, devised merely to give information concerning equilibrium states.

On the other hand, real-life engineering problems involving heat transfer deal with non-equilibrium, transient states and the structure of matter (shapes, sizes, materials, etc.). In this respect, most engineering heat transfer problems are not capable of solution by thermodynamic reasoning alone. In heat transfer, as in other areas of engineering, successful solutions to problems often require assumptions and idealizations. Further, because in many situations, it is almost impossible to describe physical phenomena exactly, it is necessary to make approximations in forming solutions to a problem.

The present invention is based, in part, upon assumptions, idealizations and approximations, relating to the heating of food, and more particularly to the cooking of food products in a deep fat fryer. It is important to keep such assumptions, idealizations and approximations in mind as they relate to the present invention.

One idealization made in the context of the present invention relates to the food product to be cooked. The concept of the present invention is based upon cooking a specific food product, i.e., a food product of specific size, shape, mass, weight and material.

As used hereinafter, the term "specific food product" refers to a food of generally a specific shape, size, mass, weight and material. By way of example, in the context of the present invention, a "curly-Q" (corkscrew) french fry is not the same "food product" as a "crinkle cut" french fry or traditional fry of uniform rectangular cross-section. Moreover, a traditional french fry from an Idaho potato is not the same "food product" as a fry of the same shape from a red-skinned potato. Each "type" of french fry and potato would represent a "specific food product." Further, it will be appreciated that while assumptions and approximations are made based upon the specific food product being the same size, shape, mass, weight and material, in reality, the food product will vary with respect to these parameters.

Figure 2:
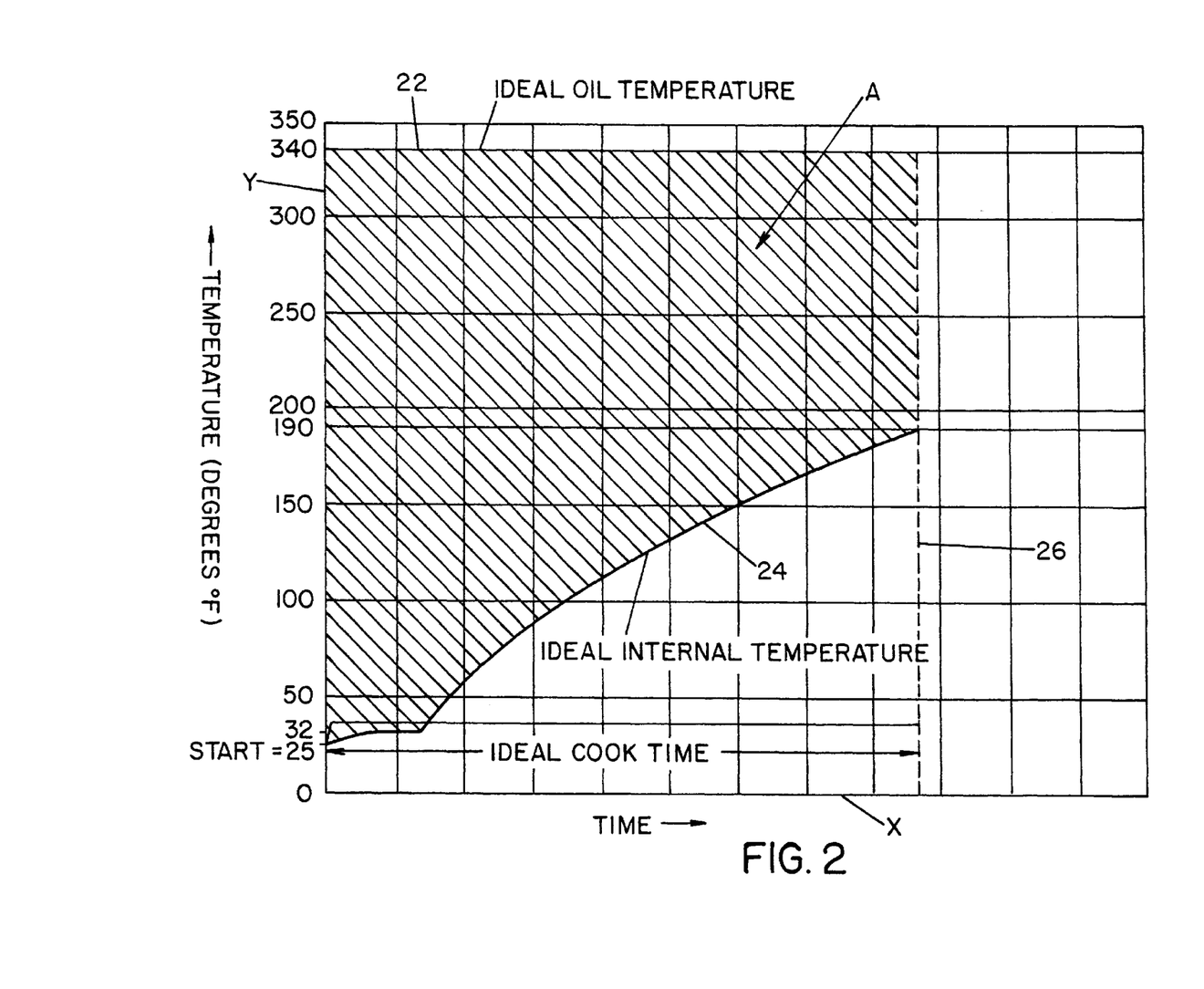
FIG. 2 is a time/temperature graph illustrating the ideal cook time, the ideal cook temperature and the internal temperature of a specific food product during an ideal cook cycle.

Referring now to FIG. 2, a temperature/time graph illustrating an exemplary "ideal cook" for a specific food product is shown. The graph in FIG. 2 shows the temperature of a cooking medium, designated in the drawing by line 22, and the internal temperature of the food product, designated by line 24, over the cooking period, which shall hereinafter be referred to as the "ideal cook time," designated by line 26. The graph in FIG. 2 shows the initial temperature of the cooking medium being 340° F. and remaining constant at 340° F. throughout the ideal cook time. Temperature line 24 shows an "initial starting temperature" of the food product at 25° .F, indicating a frozen food product. FIG. 2 illustrates how the internal temperature of the food product rises during the cooking period until it reaches a desired final internal temperature. In the example shown, the final desired internal temperature of the food product is 190° F. FIG. 2 basically illustrates a hypothetical "ideal cook" for a small amount of the specific food product, wherein the amount of food product is so small it does not affect the temperature of the cooking medium and the temperature of the cooking medium remains constant throughout the cooking period. The cook is complete when the temperature of the food product rises from the known initial internal temperature at the beginning of the cook to a desired final internal temperature at the end of the cook time, in the present example, 190° F.

As previously discussed, the ideal cook time and ideal cook temperature shown in FIG. 2 represent values established through test cooks utilizing single pieces or very small amounts of a particular food product under ideal conditions, specifically conditions where the initial internal temperature of the food product is known and the desired temperature of the cooking medium remains constant throughout the cook. Moreover, the ideal cook time and ideal cook temperature depicted in FIG. 2 relate to a specific food product having a particular shape. In this respect, the nature of the food product (e.g., fish, chicken, or potato), as well as the shape and surface configuration of the food product, affects its cooking time. Thus, an ideal cook time and ideal cook temperature for a specific food product, such as that shown in FIG. 2, are functions of the type of food, as well as its shape, configuration, and mass.

Basically, the "ideal cook time" and "ideal cook temperature" are established to enable users of the fryer to repeatably prepare foods of the same quality. It is believed that if the same food product, i.e., a product of the same food, mass, shape and initial temperature, is cooked at the "ideal cook temperature" for the "ideal cook time," the product should reach the desired internal temperature and the desired quality. Further, it is believed that if cooked under these conditions, the surface characteristics of the food so prepared should be the same as the food prepared in the test cooks which established the ideal cook time and ideal cook temperature. The specific food product can then be repeatedly prepared to the same result time and time again by using the ideal cook criteria.

Figure 3:
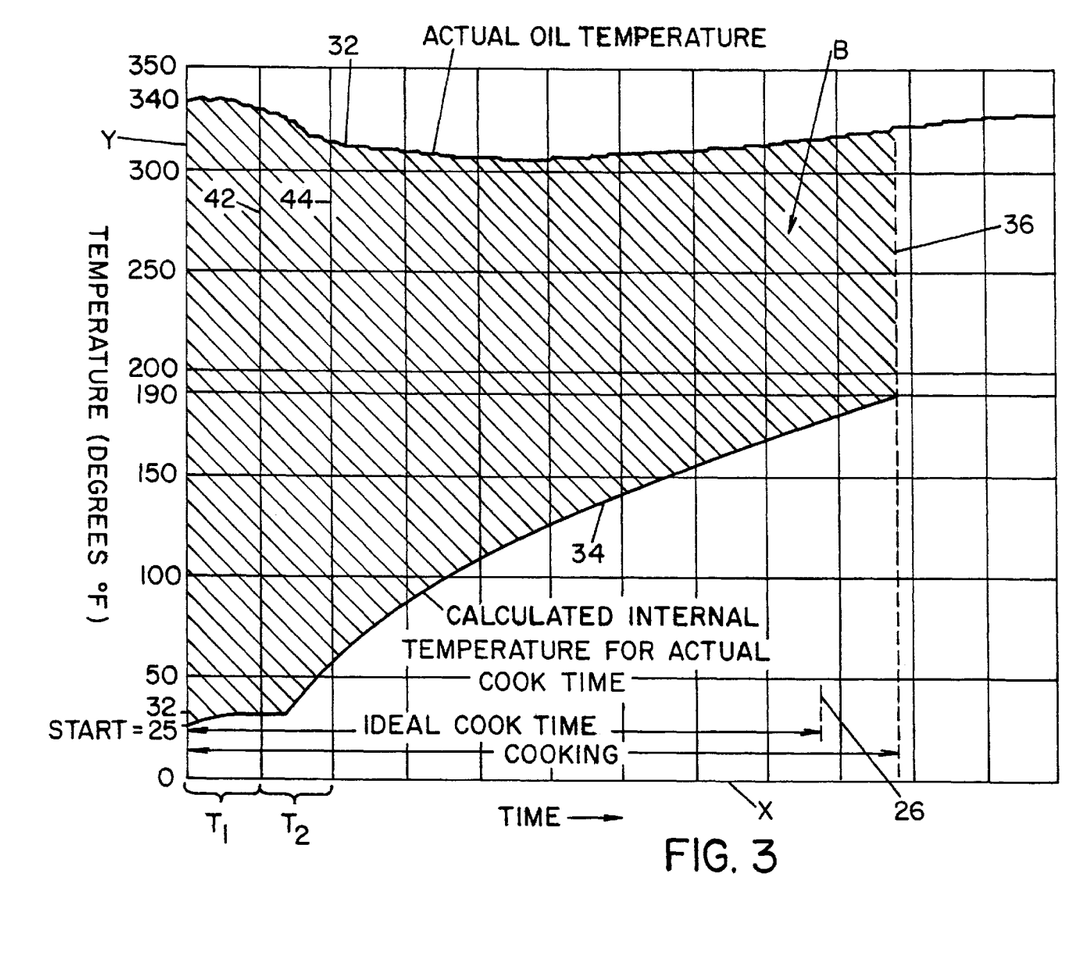
FIG. 3 is a time/temperature graph showing the temperature of a cooking medium during an actual cook cycle, and illustrating the internal temperature of the specific food product during such cook cycle.

Referring now to FIG. 3, a time/temperature graph illustrating an actual cook of a large batch of the same food product used in FIG. 2 is shown. In reality, foods cooked in fryers, of the type to which the present invention is particularly applicable, are not cooked in the small amounts prepared during the aforementioned test cooks to establish the "ideal cook time" and "ideal cook temperature." Typically, food products are cooked in large batches, and depositing such large amounts of generally cold, i.e., frozen, food into the hot cooking medium causes the temperature of the cooking medium to drop during the cooking period. In response to this drop in temperature of the cooking medium, most fryer controllers typically turn on a heating element to input heat energy into the system to compensate for the drop in temperature. As will be understood from a further reading of the specification, the method or manner in which this heat is inputted into this system in and of itself form no part of the present invention, and does not affect the operation of the system as hereinafter described.

In FIG. 3, the actual temperature profile of the cooking medium, designated by line 32, initially drops as the result of the introduction of cold food product into the hot cooking medium. The temperature of the cooking medium bottoms out and then begins to rise as the result of heat inputted into the system as described above. Line 32 of FIG. 3 thus illustrates a typical temperature profile of a cooking medium during an actual cook. As a result of the temporary drop in the temperature of the cooking medium, the internal temperature of the food product, designated in FIG. 3 by line 34, will take longer to reach the desired internal temperature (190° F. in the FIGS. 2 and 3) for the given food product. In other words, because of the drop in temperature of the cooking medium from the ideal cook temperature (i.e., 340° F.), a longer cooking time, as designated in FIG. 3 by line 36, is required to heat the food from its initial temperature to the desired final internal temperature.

Thus, while line 24 of FIG. 2 depicts the temperature profile of a specific food product under ideal conditions, i.e., constant temperature of the cooking medium for a set cooking time, line 34 of FIG. 3 depicts the temperature profile of the same food product under actual cooking conditions, wherein the temperature of the cooking medium drops as a result of the introduction of cold, food product.

Importantly, in both situations, the amount of thermal energy required to heat the food product from the same initial internal temperature to the same desired internal temperature is the same. In this respect, the amount of energy necessary to produce a change in temperature of an object, (be it a food product or other material) from a first initial temperature to a second desired temperature is based upon an established law of thermodynamics:

$$Q=mC(\Delta T),$$

where Q is the amount of energy required to increase the temperature of an article by $\Delta T$, m is the mass of the article typically in kilograms (kg), C is the specific heat of the article typically given in Joules/kg °C., and $\Delta T$ is the difference in temperature from the initial temperature of the article to the final temperature of the article, typically in °C. Because the specific food product being used in the ideal cook of FIG. 2 and the actual cook of FIG. 3 is the same, it has the same mass (m) and specific heat (C), and since the change in temperature $\Delta T$ of the food product is the same in both examples, the heat energy Q is necessarily the same for both cooks.

Importantly, the foregoing law of thermodynamics does not address the time in which the heat energy Q is transferred. In this respect, thermodynamics deals with the relationship of the heat lost by the cooking medium and the heat gained by the food product. That is, in the present situation, involving the heating of a food product, the laws of thermodynamics deal with the amount of heat transferred. Kinetics, on the other hand, deals with the time taken to transfer heat to an object, and is basically dependent on the shape of the object. In contrast, the shape is not a factor in the amount of heat energy transferred.

Broadly stated, the present invention is based in part upon the principle that repeated cooks of the same food product having the same mass and configuration, and having the same initial starting temperature, will require the same amount of heat energy to cook the food product to a desired final internal temperature. In the context of the present invention, the ideal cook time and ideal cook temperature are based upon a food product of known mass and configuration. The discussion of the present invention will therefore relate to cooking the same food product, i.e., having the same mass, shape and same specific heat, as utilized in establishing the ideal cook shown in FIG. 2.

In the context of the present invention, it should be appreciated that the "ideal cook criteria," i.e., the "ideal cook time" and "ideal cook temperature," are basically a user's recipe or guidelines for producing a desired end product from a specific food product. Stated another way, the ideal cook time and ideal cook temperature define conditions by which a specific food product should be cooked, and basically provide the solution (i.e., information) necessary to consistently and repeatedly produce the desired end product. The present invention basically utilizes the user's "solution," reflected by the ideal cook time and ideal cook temperature to control cooking of the food product.

With respect to performing actual cooks using the "ideal cook criteria," an assumption is made that during an actual cook involving a large batch of the food product, that the food product will be cooked in a cooking medium maintained at a desired (i.e., ideal) temperature, and that each individual piece within a batch will be entirely surrounded by the cooking medium. Theoretically, if the cooking medium can be maintained at this desired ideal temperature throughout, the desired results will be achieved if the batch is cooked for the "ideal cook time." In other words, ideally, if each french fry or each piece of chicken within the batch of french fries or chicken is surrounded by a cooking medium at a predetermined, desired, ideal temperature, cooking the food at that ideal temperature for a predetermined period of time will obtain the desired results, i.e., the same surface characteristics and internal temperature as was established during the test cooks which generated the "ideal cook time" and "ideal cook temperature."

Referring again to FIG. 2, it is believed that the area defined by the Y-axis, line 24 (the internal temperature of the food), line 22 (the ideal temperature of the cooking medium), and line 26 (the ideal cook time), an area designated "A" in FIG. 2, is representative of the energy required to cook the specific food product. In other words, for a constant mass (m) and a specific heat (C) food product, area A defines a "time-energy value," which is indicative of the thermal energy required to cook the specific food product under ideal operating conditions from an initial internal temperature of 25° F. to a final internal temperature of 190° F.

Similarly, since FIG. 3 represents actual cooking conditions of the same type of food product, the same amount of energy should be required to heat the food product from the initial internal temperature to the desired final internal temperature. It is, therefore, also believed that in FIG. 3, the area defined by the X axis, line 32 (the actual temperature of the cooking medium), line 34 (actual internal temperature of the food product) and line 36 (the time defined between the start of the cook and the point at which the actual internal temperature of food product reaches the desired internal temperature), designated "B" in FIG. 3, is representative of the energy required to cook the food to the desired internal temperature. Because both FIG. 2 and FIG. 3 represent time/temperature graphs for cooks involving the same type of food product having the same shape and configuration, the foregoing law of thermodynamics indicates that the same amount of energy will be required to cook the food product from the same initial temperature to the same desired internal temperature. Thus, area A of FIG. 2 should theoretically be the same as area B of FIG. 3.

In its broadest sense, the present invention is based upon the assumption that area A of FIG. 2 and area B of FIG. 3 are both representative of the same energy value that is required to cook a specific food product having a specific shape, mass and specific heat from a known initial internal temperature to a desired final internal temperature. Accordingly, the cooking of a specific food product to compensate for fluctuations in temperature of the cooking medium from an ideal standard can be accomplished by determining the heat transferred from the cooking medium to the food product.

According to the present invention, a system and method is provided to determine a reference energy value from the ideal cook criteria. Subsequent cooks of the same food product can be controlled by monitoring the energy transferred from the cooking medium to the food product during the subsequent cook, comparing the energy transferred from the cooking medium to the food product during the subsequent cook against the ideal reference energy value, and ending the cook cycle when the energy value transferred to the food product is equal to the reference energy value.

According to the broadest aspect of the present invention, control unit 20 includes a microprocessor (not shown) having a summation routine to determine time/temperature values representative of the amount of energy transferred to a specific food product during a cook. According to the present invention, the control unit 20 utilizes the summation routine to determine a "reference energy value" for an "ideal cook." The reference energy value is determined from the ideal cook criteria (i.e., the ideal cook time, ideal cook temperature and the ideal internal temperature profile) as shown in FIG. 2. The "reference energy value" is basically the time/temperature value defined by area "A" of FIG. 2, and is representative of the amount of energy needed to cook the specific food product from its known initial internal temperature to a desired final internal temperature. To calculate the reference energy value, the summation routine, at selected time intervals, takes the difference between the ideal cook temperature and the ideal internal temperature. Each temperature difference is then multiplied by the duration of the time interval to produce a temperature-time value. Each temperature-time value for a time interval is added to a register which stores the sum of the temperature-time values. The summation routine operates from the start of the ideal cook (at time=0) until the duration of all the time intervals equals the ideal cook time. The "reference energy value" is the sum of the temperature-time values during the ideal cook time.

The time intervals between calculations may be one (1) second, a fraction of a second or a multiple of a second. As will be appreciated, the smaller the time interval between calculations, the more accurate will be the resulting value generated by the summation routine. In determining the reference energy value, line 24, could be a power law, e.g., indicative of the internal temperature of the food product, or could be a pre-established model line based upon a predetermined equation. Alternatively, control unit 20 could include a program to calculate (i.e., generate) line 24 based upon the ideal cook time and ideal cook temperature for a given food product. In other words, the microprocessor within control unit 20 would be programmed to calculate the internal temperature of the food product (i.e., line 24 of FIG. 2), based upon the initial temperature of the food product, the desired final internal temperature of the food product, and the ideal cook temperature of the cooking medium. In other words, the program would basically generate a line 24 based upon the given set of parameters (i.e., the initial internal temperature of the food product and the desired ideal cook temperature), and then use such line 24 to calculate the reference energy value, i.e., area "A" of FIG. 2.

Thus, utilizing the line 24, the ideal cook temperature line 22 and the ideal cook time, line 26, microprocessor calculates area "A" as a temperature/time value. This temperature/time value is established as the "reference energy value" indicative of when cooking of the designated food product has been completed. This reference energy value is stored in the memory of the microprocessor.

When an actual cook is to be performed, a similar summation of energy values is performed. However, because the actual temperature of the cooking medium does not remain constant during an actual cook, but varies as a result of the introduction of the cold food product and the application of heat to the system, model line of the internal temperature profile cannot be used. According to the present invention, control unit 20 utilizes the internal temperature calculating program, as described above. During an actual cook, the temperature of the cooking medium is periodically sensed by temperature sensor 12 and conveyed to control unit 20. Temperature signals from temperature sensor 12 basically define line 32 of FIG. 3. Using such information, and knowing or assuming the initial internal temperature of the food product, control unit 20 can generate internal temperature profile line 34 during the cook. In this respect, the internal temperature calculating program is based upon the aforementioned principles of heat transfer and upon knowing the initial temperature of the food product and the temperature of the cooking medium. The temperature calculating routine within control unit 20 thus calculates line 34 representative of the internal temperature profile of the food during the cook based upon the actual temperature of the cooking medium (line 32) and by knowing the starting internal temperature of the food product. Stated another way, the internal temperature calculating program would be based upon known principles of heat transfer, and would be operable to calculate the internal temperature of the food product "on-the-fly" by incremental integration (i.e., repeatedly calculate the internal temperature of the food product during the actual cook based upon the changing conditions during the cook).

Knowing the actual temperature of the cooking medium as sensed by temperature sensor 12, and having generated an internal temperature line 34 for the specific food product, the summation routine described above periodically calculates the thermal energy being transferred from the cooking medium to the food product. The computer basically calculates an area bounded between the actual temperature line 32 and the calculated internal temperature line 34 for a specific time interval. The area of this time interval is representative of the heat energy transferred from the cooking medium to the food product during such time interval. By summing each of the representative energy values calculated for each time interval, control unit 20 can monitor the amount of heat being transferred from the cooking medium to the food product.

By way of example, in FIG. 3, a first interval, designated $T_1$ is defined between the Y-axis and line 42. According to the present invention, a close approximation of the area defined by line 32, line 34, line 42 and the Y-axis can be obtained by taking the difference between the values of lines 32 and 34 at some point between the Y-axis and line 42, and then multiply the resulting value by the time interval $T_1$ to generate a temperature-time value for time interval $T_1$. The difference between line 32 and line 34 may be taken at the beginning of the time interval $T_1$ at the end of the time interval $T_1$ or any where therebetween. The value calculated for time interval $T_1$ is thus representative of the heat energy transferred from the cooking medium to the food product during time interval $T_1$. A second time interval $T_2$ is defined between line 42 and line 44. By performing the above calculation, the representative energy value transferred from the cooking medium to the food product for time interval $T_2$ can be determined. By repeating the calculation for each time interval, and summing the heat energy values for each time interval, control unit 20 can monitor the amount of heat being transferred to the food product and terminate the cook when the summed heat energy value equals the "reference energy value."

Figure 4:
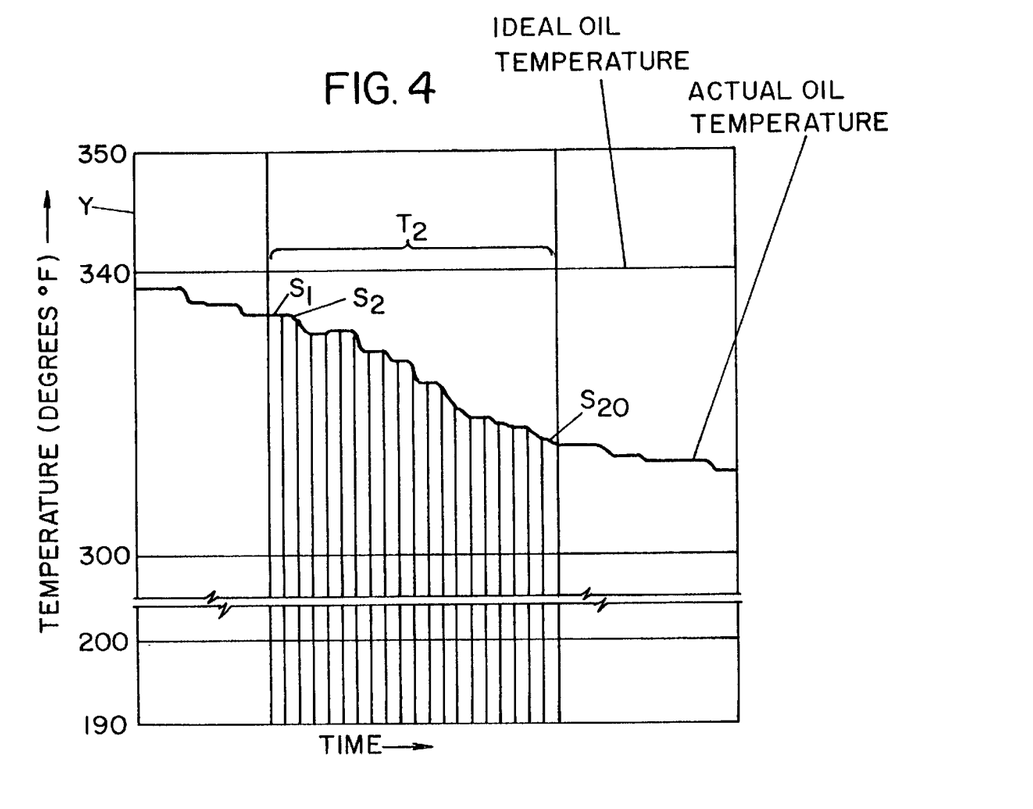
FIG. 4 is an enlarged portion of the time/temperature graph divided into subintervals.

As will be appreciated, the smaller the sampling time interval, the more accurate the calculation of the areas bounded by lines 32 and 34. FIG. 4 shows time interval $T_2$ divided into twenty subintervals $S_1$–$S_{20}$. If the "transferred energy value" is calculated for each subinterval $S_1$–$S_{20}$, a more accurate value for the heat energy transferred from the cooking medium to the food product can be obtained.

The aforementioned summation routine is performed based upon the actual sensed temperature of the cooking medium and the calculated internal temperature of the food product. As will be appreciated, the foregoing system is based upon several relatively complex and time-consuming calculations that are required to determine the internal temperature of the food product throughout a cook.

Specifically, the calculation of the representative heat energy value being transferred from the cooking medium to the food product during an actual cook is based upon the ever-changing temperature of the cooking medium (line 32) and the ever-increasing internal temperature of the food product (line 34).

According to another aspect of the present invention, a simplification of the calculation of the transferred heat energy can be made if a constant temperature, related to the desired final internal temperature of the food product, is used in calculating the transferred heat energy value, instead of the ever-increasing internal temperature of the food product (line 34). An assumption is made that a constant temperature value related to the desired final internal temperature of the food product can be used, instead of the constantly-rising internal temperature line of the food product, when determining the area between the respective temperature lines.

Figure 5:
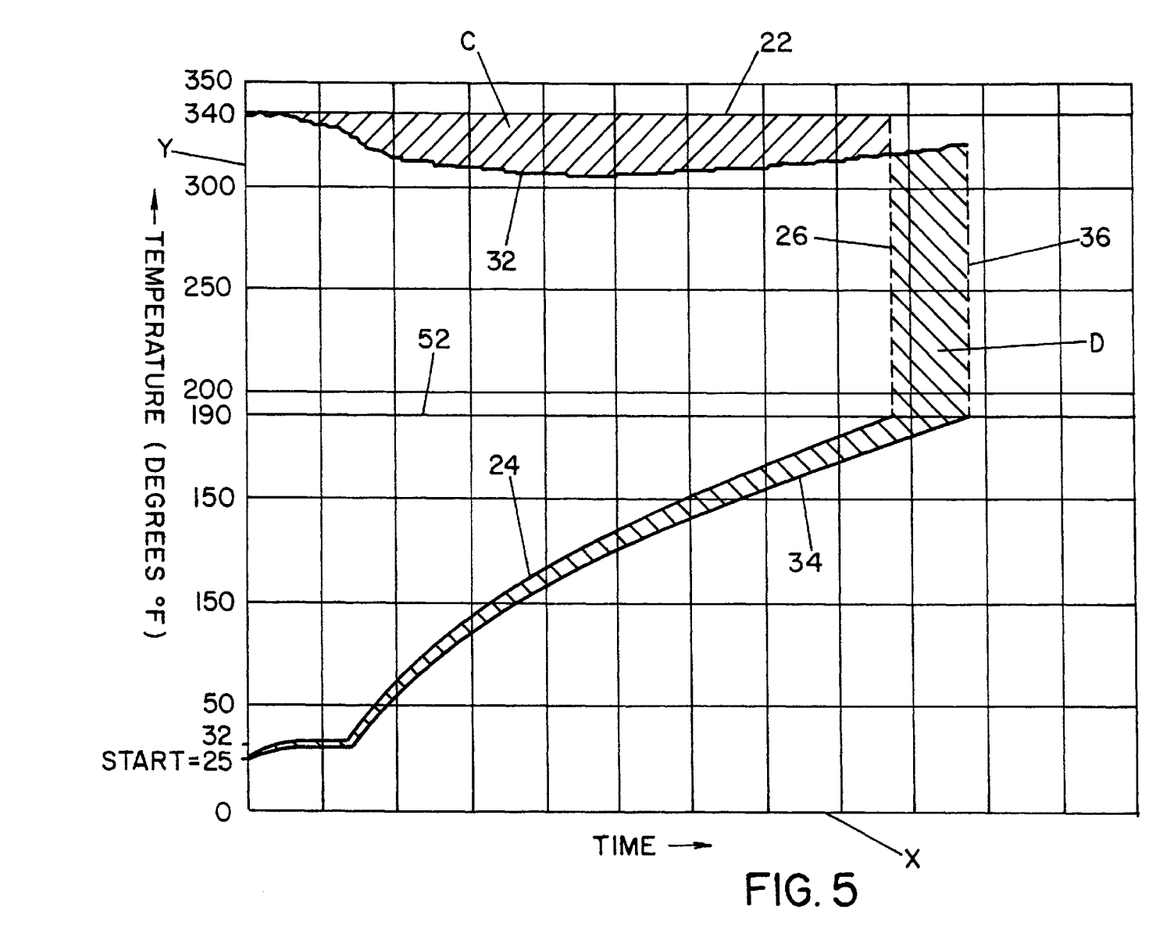
FIG. 5 is a time/temperature graph showing the ideal cook profile of FIG. 2 and the actual cook profile of FIG. 3 superimposed.

To understand this simplification to the calculation, reference is made to FIG. 5, wherein the time/temperature graphs of FIGS. 2 and 3 are shown superimposed one on the other. Shaded areas, designated "C" and "D," show respectively areas not common to areas "A" and "B." As indicated previously, it is believed that areas "A" and "B" are representative of the thermal energy required to cook the specific food product, and that areas "A" and "B" are assumed to be equal. Accordingly, shaded area "C" should be equal to shaded area "D."

As seen in FIG. 5, the difference between area "A" and area "B" below the 190° F. line designated 52, i.e., the portion of area "D" below the 190° F. temperature line, is relatively small. This small area is representative of a difference in heat energy. If this relatively small difference is ignored in the calculation of the heat energy, the calculation of the reference energy values and the energy values transferred during an actual cook can be simplified. Thus, according to an alternate embodiment of the present invention, rather than calculating and comparing the total areas defined by the ideal cook lines 22, 24, 26 and the actual cook lines 32, 34, 36, the program, within control unit 20, would utilize the desired final internal temperature of the food product, or a constant temperature value related thereto, as the temperature of the food product in determining the respective areas.

Figure 6:
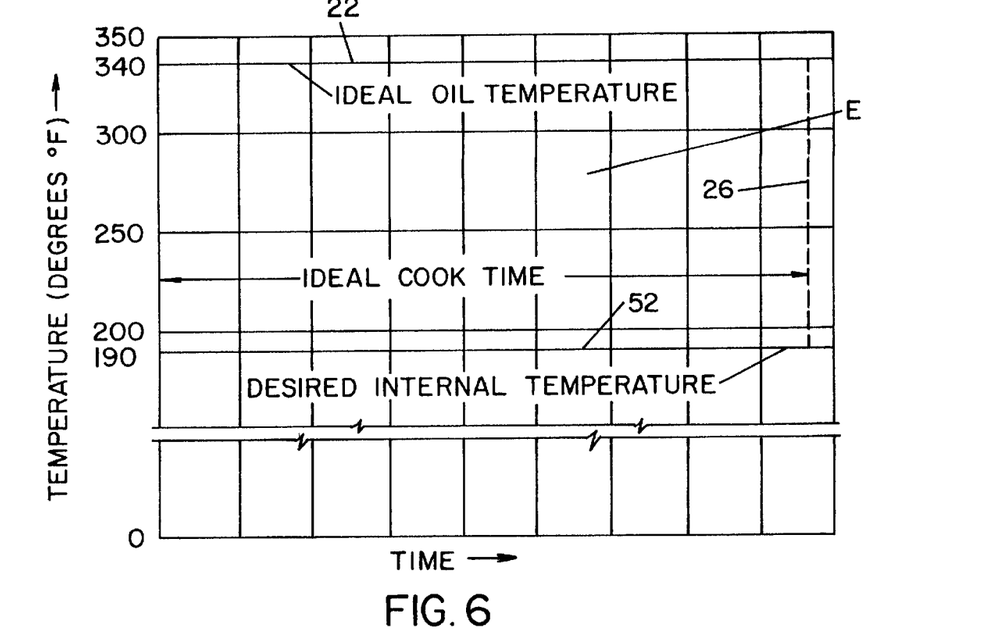
FIG. 6 is a time/temperature graph for an ideal cook cycle illustrating a simplified method for calculating heat energy transferred to a food product during the ideal cook cycle.
Figure 7:
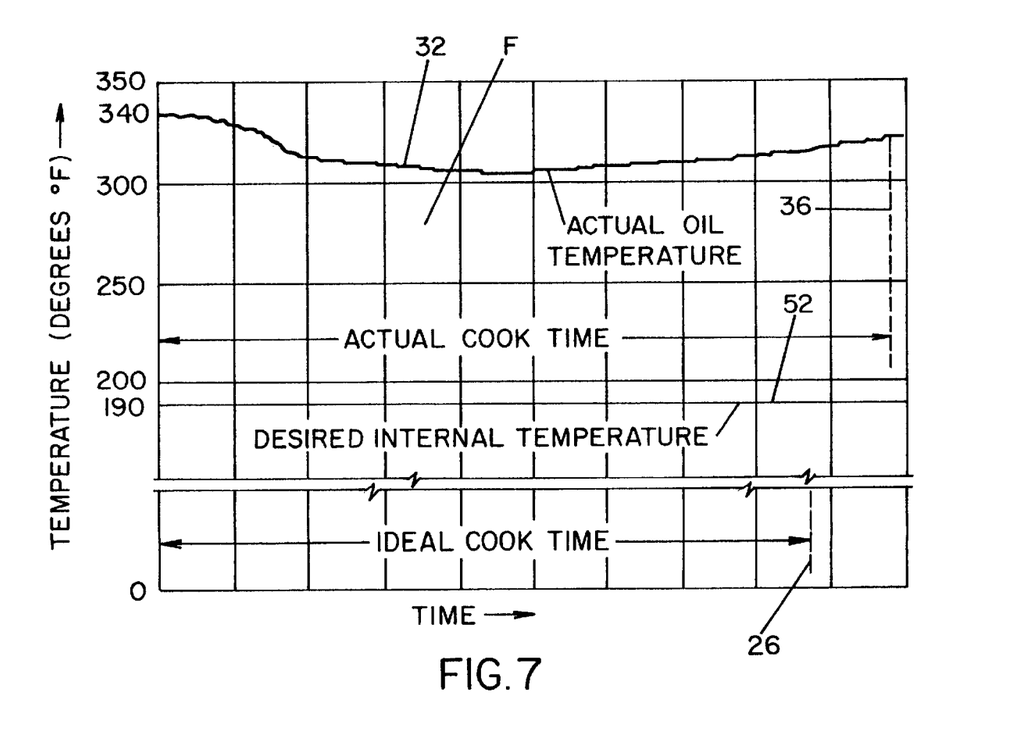
FIG. 7 is a time/temperature graph for an actual cook cycle illustrating a simplified method for calculating the heat energy transferred to the food product during the actual cook cycle.

FIGS. 6 and 7 illustrate the simplified embodiment of the present invention. FIG. 6 represents an "ideal" cook based upon an ideal cook temperature (line 22) and an ideal cook time (line 26) that are the same as shown in FIG. 2. FIGS. 6 and 7 are respectively FIGS. 2 and 3, but with the portion of the graphs below line 52, i.e., the 190° F. line, eliminated. The reference energy established by the "ideal cook" criteria in FIG. 6, would be defined by the area designated E of a rectangle defined by line 22 (the ideal cook temperature), line 52 (the desired internal temperature of the food product) and line 26 (the ideal cook time). Basically, the reference energy can be calculated by taking the difference between the ideal cook temperature (line 22) and the desired internal temperature (line 52) and multiplying this value by the ideal cook time (line 26). Using the values shown in FIG. 6, the reference energy value would be (340° F.–190° F.) multiplied by the ideal cook time in seconds.

During the actual cook, as illustrated in FIG. 7, temperature sensor 12 would provide an indication of the actual temperature of the cooking medium at periodic time intervals. The difference between the actual sensed temperature (line 32) and the desired internal temperature (line 52) would be multiplied by the time interval to obtain a transferred energy value indicative of the thermal energy transferred during that time interval. The energy values for each time interval would be accumulated and summed. Since area F is approximately equal to area E, when the total accumulated transferred energy values of area F equals the reference energy value of area E, the cook is complete.

Thus, with the foregoing simplification, the calculation of reference energy value of the ideal cook and the transferred energy value of an actual cook are greatly simplified. As indicated above, the smaller the time interval for the sampling of the temperature and calculation of the transferred energy, the more accurate the approximation of the area defined during the actual cook.

The simplified calculation is based upon the assumption that a constant temperature, such as the desired internal temperature of the food product, may be used as a "lower temperature" reference in the summation routine. An even closer approximation may be established by utilizing a constant temperature above or below the desired internal temperature as the lower reference temperature in the summation program. In this respect, by varying the lower reference temperature and monitoring the operation of the system and the resultant food product during several actual cooks, an appropriate lower reference temperature for use in the summation operation can be established for a particular food. This constant temperature may be a preprogrammed temperature or may be a temperature which is adjustable based upon the results of a cook so as to enable a user to adjust the results to more closely reproduce those under the ideal cook criteria.

With respect to establishing the lower reference temperature, it has been found that the best results seem to occur when the lower reference temperature used in the foregoing calculation is approximately 210° F. It appears that the boiling point of water (212° F.) is a critical temperature in the cooking of foods, in that most food products contain large amounts of water. The moisture in the food products is believed to act as a sort of temperature barrier preventing heating of the food product beyond 212° F. until all of the moisture within the food product has been removed (typically as steam). Because many of the food products prepared in deep-fat fryers, such as chicken, fish, pastries, have a coating to keep in moisture, and other such as products as french fries, are cooked for a relatively short time, most of the moisture within the food product does not escape, but rather is maintained within the food product as moisture or steam. For this reason, it is believed that the boiling point of water, i.e., 212° F., is critical to the cooking process. In this respect, it has been found that the foregoing calculation works best for most food products when the lower temperature, i.e., the "desired internal temperature," is set at between 200° F. and 215° F., and more particularly at 210° F.

The present invention as heretofore described thus provides a method of controlling the cooking of a food product by basically monitoring the thermal energy transferred from the cooking medium to the food product. A cook cycle is complete when a transferred energy value representative of the energy transferred to the food product is equal to a reference energy established by ideal cook criteria. Preferably, in a simplified program, the summed transferred energy values of the actual cook are based upon a difference between the actual temperature of the cooking medium and a constant temperature, which constant temperature is generally related to the particular food product to be cooked and the desired internal temperature of the food product, or to a temperature near the boiling point of water.

With respect to the foregoing description of the present invention, it should be pointed out that the reference energy value determined by the "ideal cook time" and "ideal cook temperature" could be determined other than by using a very small load of food product. In this respect, use of a small load is an economical way to determine the reference energy value in that a small load, when placed in a large vat of cooking medium does not affect the temperature of the cooking medium to any significant extent, and thus for all practical purposes, a constant "ideal temperature" is used to determine the "reference energy value." It would also be possible to develop the reference energy value for a specific food product from a partial load or a full load. Since these larger loads would affect the temperature of the cooking medium, it would be necessary to monitor and plot the temperature of the cooking medium during the test cook, and use this plotted line of the temperature of the cooking medium as the "ideal oil temperature" line when determining the area bounded by the "Y" axis, the ideal temperature line, ideal cook time line and the ideal internal temperature line (or other related constant value).

For example, if the graph shown in FIG. 3 represented a test cook utilizing a full load to establish the reference energy value, area B of the FIG. 3 would be the reference energy value. Subsequent full load cooks (i.e., same size loads) would theoretically produce the same change in the temperature of the cooking medium and the same change in the internal temperature of the food product. Therefore, the transferred energy values in subsequent cooks should equal the reference energy value when the actual cook time reaches the ideal cook time. In other words, like loads will be cooked in like time periods.

For loads smaller than that used to establish the reference energy value, the cook would be completed before the "ideal cook time" is reached. For example, if the subsequent cook used a very small load which did not appreciably affect the temperature of the cooking medium, the graph of FIG. 2 would be representative of such cook and area "A" would be representative of the "transferred energy." Since the transferred energy value would equal the "reference energy value" in a shorter period of time, the cook of the small load would be completed sooner.

Thus, it is possible to develop the "reference energy value" from small, medium or even large loads, and a controller according to the present invention will adjust subsequent cooks based upon the load of the subsequent cook and the rate at which energy is being transferred to the food product.

Figure 8:
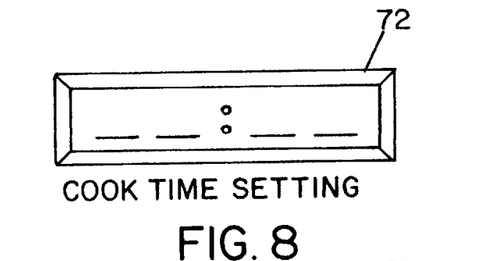
FIG. 8 is a schematic representation of a display for use with the present invention for illustrating a Cook Time Setting.
Figure 9:
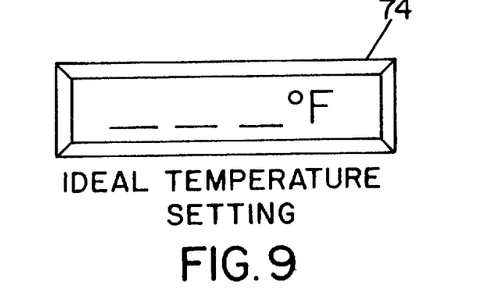
FIG. 9 is a schematic representation of a display for use with the present invention for illustrating an Ideal Temperature Setting.
Figure 10:
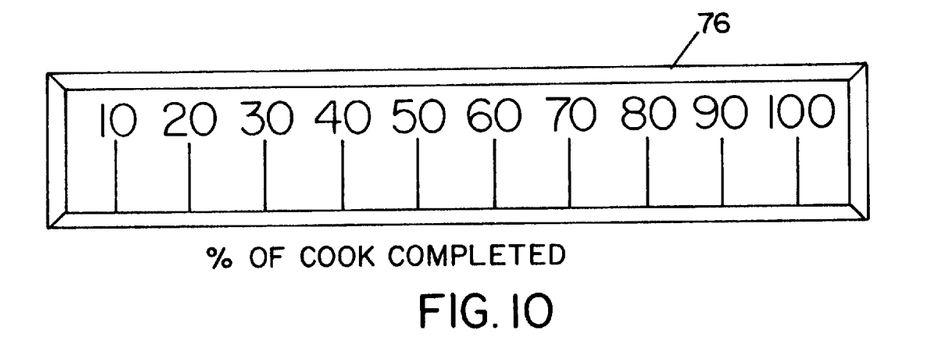
FIG. 10 is a schematic representation of a display for use with the present invention for illustrating the Percentage (%) of Cook Completed.

As indicated above, the cooking of food according to the present invention occurs irrespective of the inputted cook time. The inputted or selected cook time, i.e., the ideal cook time, is used initially to establish the reference energy value. Once the reference energy is determined, a cook is complete when the summed, transferred energy values during the actual cook equals the reference energy value, regardless of time. For users requiring or desiring some indication of the progression of the cook cycle, circuitry may be provided to indicate a percentage of the total cook completed based upon when the summed transferred energy values equal specific percentages of the total reference energy value. For example, FIGS. 8–10 illustrate proposed control panels for use with the present invention. Information regarding the ideal cook time and ideal cook temperature may be inputted into the system by a key panel (not shown) and displayed by digital display panels, designated 72 and 74 in FIGS. 8 and 9. The progression of the cook may be indicated by percentages on a panel designated 76 on FIG. 10. The control unit 20 would include a program operable to calculate set percentages, i.e., 10%, 20%, etc., of the total reference energy value required to cook the selected food product. During an actual cook, when the energy transferred to the food product, as determined by the summation routine within the controller, reaches a specific percentage value, that value is illuminated on panel 76 to indicate to the user the progress of the cook and the percentage of the cook which is completed. In this respect, once the ideal cook time is entered into the controller, and the total reference energy value calculated, the controller operates independently of the cook time.

Likewise, for users desiring an indication of time, the present system may be programmed to display time as an indication of the energy values measured throughout an actual cook. To this end, when a constant lower reference temperature is used to establish the ideal reference energy value for a cook cycle, an assumption can be made that under the ideal cook conditions uniform energy values will be transferred to the food product during set time intervals. This is because the temperature difference between the "ideal cook temperature" and the lower reference temperature remains the same over each such time intervals. Using this constant reference energy value for specific time intervals as a reference mark, time on a display clock can be decremented or incremented when measured energy values during an actual cook equal or exceed select reference energy values. For example, for a one (1) second time interval, the reference energy value indicative of energy transferred to the food product is the difference between the "ideal cooking temperature" and the constant temperature used as the lower constant, multiplied by one second. This reference energy value is basically the temperature difference expressed in "degree-seconds." Theoretically, this energy value represents the amount of energy which should be transferred to the food product for each second of real time. By utilizing the aforementioned summation routine, the energy transferred to the food product during an actual cook is monitored. When the summed transferred energy value is equal to the reference energy value for one (1) second, a clock indicator can be decremented by one to indicate to the user that one (1) second of the ideal cook has been completed. Thus, while the actual system is monitoring and measuring energy transfer, such measurements can be equated to a visual display of unit time when the actual measured, transferred energy values equal some reference energy value for a given time to provide the user some indication of the progress of the cook.

The foregoing description describes specific embodiments of the present invention. It should be appreciated that these embodiments are described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A controller for controlling a cooking of a food product within a cooking medium, said controller comprising:
   a temperature sensor for obtaining the temperature of a cooking medium;
   means for determining an ideal energy value based upon an ideal cook time and an ideal cooking medium temperature inputted by a user;
   means for initiating a cooking cycle to heat the food product therein within said cooking medium;
   means for determining plural indications of incremental energy being adsorbed by said food product during said cooking cycle, wherein each of said plural indications of incremental energy is based upon a difference between a temperature determined by said temperature sensor and a constant temperature value; and
   means for signaling the end of the cooking cycle when the total of said plural indications of incremental energy is at least equal to said ideal energy to prepare said food product.

2. The controller as set forth in claim 1, wherein said ideal energy value is comprised of a cook time to prepare said food product to a desired comestability at a user selected ideal cooking medium temperature combined with a difference between said user selected ideal cook temperature and the constant temperature value.

3. The controller as set forth in claim 1, further including a display for indicating progression of the cook of said food product.

4. The controller as set forth in claim 3, further including means for determining a reference energy comprised of a reference interval of time combined with a difference between a user selected ideal cooking medium temperature and constant temperature value, said display being updated when the total of said incremental energy absorbed by said food product after a prior update of the display is one of greater than the reference energy.

5. A cooking appliance, comprising:
   means for sensing temperature of a cooking medium;
   means for initiating a cook of a food product disposed in said cooking medium; and
   a controller operatively connected to the temperature sensing means for determining the duration of the cook as a function of a difference between a user selected cooking medium temperature and a constant temperature, wherein said controller combines plural indications of incremental energy being absorbed by said food product during said cook and produces a cook termination signal when the total of the incremental energy is one of equal to or greater than an indication of ideal energy, said indication of ideal energy comprising a cook time to prepare said food product to a desired comestability at said user selected temperature combined with the difference between said user selected temperature and said constant temperature value.

6. The cooking appliance as set forth in claim 5, wherein the cook duration is further a function of differences between the desired internal temperature and temperatures of the cooking medium during the cook.

7. The cooking appliance as set forth in claim 5, wherein each of said plural indications of incremental energy is comprised of an interval of time combined with a difference between the temperature of the cooking medium determined relative to said interval of time and said desired internal temperature of the product.

8. A controller for controlling the cooking a food product within a cooking medium, said controller comprising:

a temperature sensor for obtaining the temperature of the cooking medium;

means for establishing a reference energy value corresponding to a predetermined amount of energy to be transferred to the food product;

means for activating a cooking cycle to heat the food product in the cooking medium;

means for determining a transferred energy value corresponding to the amount of heat energy transferred to said food product during activation of said cooking cycle, wherein said transferred energy value increases as said cooking cycle remains activated;

comparison means for comparing said transferred energy value to said reference energy value;

means for deactivating the cooking cycle when said transferred energy value is equal to or greater than said reference energy value.

9. An apparatus for controlling the cooking of a food product in a heated cooking medium, said apparatus comprising:

means for determining a reference energy value for a food product from an ideal cook temperature value established by a user for said food product and an ideal cook time value established by a user for said food product, said reference energy value representing an amount of heat energy to be transferred to the food product to produce a desired cooked food product;

means for monitoring the start of a cooking cycle to heat the food product in a cooking medium;

means for monitoring the temperature of the cooking medium during a plurality of time intervals;

means for determining a heating transfer energy value from the temperature of the cooking medium during each of said plurality of time intervals, wherein the heat transfer energy value for a time interval corresponds to the amount of heat energy transferred to the food product during said time interval;

means for comparing the total of said heat transfer energy values to said reference energy; and means for determining the end of the cooking cycle when said heat transfer energy values are equal to or exceed said reference energy value.

10. An apparatus for controlling the cooking of a food product in a heated cooking medium, said apparatus comprising:

means for determining a reference energy value for a food product based upon an ideal cook temperature and an ideal cook time input by a user, said reference energy value for said food product being determined by calculating the difference between said ideal cook temperature value and a constant temperature value, and by multiplying said difference by the ideal cook time value;

a temperature sensor for monitoring the temperature of a cooking medium during a cook cycle;

means for determining a heat transfer energy value during each of a plurality of time intervals during a cooking cycle for heating the food product in said cooking medium, wherein the heat transfer energy value for a time interval is determined by calculating the difference between an actual temperature of the cooking medium during said time interval and said constant temperature value, and by multiplying said difference by said time interval;

means for determining a cumulative heat transfer energy value for said plurality of time intervals;

means for comparing said cumulative heat transfer energy value to said reference energy; and means for determining the end of the cooking cycle when said cumulative heat transfer energy value is equal to or exceeds said reference energy value.

11. An apparatus as defined in claim 10, wherein said constant temperature value is between about 210° F. and 215° F.

12. An apparatus as defined in claim 10, wherein said constant temperature value is the boiling point of water.

13. An apparatus as defined in claim 10, wherein each of said plurality of time intervals are of fixed and like duration.

14. An apparatus as defined in claim 13, wherein each of said time intervals are of one (1) second duration.

15. An apparatus as defined in claim 13, wherein each of said time intervals are of a fraction of a second duration.

16. A controller for controlling the cooking of a food product within a heated cooking medium, comprising:

a temperature sensor for obtaining the temperature of a cooking medium; and a microprocessor connected to said temperature sensor, said microprocessor programmed to:

a) determine a reference energy value for a food product based upon an ideal cook temperature and an ideal cook time value established by a user for said food product, said reference energy value representing an amount of heat energy to be transferred to the food product to produce a desired cooked food product, and b) monitor the temperature of said cooking medium during a cooking cycle for heating said food product, c) determine a heat transfer energy value during each of a plurality of time intervals during said cooking cycle, wherein the heat transfer energy value for a time interval is determined by calculating the difference between a constant temperature value inputted by said user and an actual temperature of the cooking medium during said time interval, and by multiplying said difference by said time interval, d) determine a cumulative heat transfer energy value for said plurality of time intervals, e) compare said cumulative heat transfer energy value to said reference energy value, and f) determine an end of said cooking cycle when said cumulative heat transfer energy value is equal to or exceeds the reference energy value.

* * * * *